United States Patent [19]

Sedley

[11] 4,087,660
[45] * May 2, 1978

[54] MAGNETIC CARD READER

[76] Inventor: Bruce S. Sedley, 7 Murray Ave., Larkspur, Calif. 94939

[ * ] Notice: The portion of the term of this patent subsequent to Dec. 21, 1993, has been disclaimed.

[21] Appl. No.: 701,140

[22] Filed: Jun. 30, 1976

Related U.S. Application Data

[63] Continuation-in-part of Ser. No. 556,655, Mar. 10, 1975, Pat. No. 3,999,023.

[51] Int. Cl.² .............................................. H01H 43/08
[52] U.S. Cl. .................................. 235/449; 235/493; 235/450
[58] Field of Search .................. 200/46; 235/61.11 D, 235/61.12 M; 340/149 R, 174 QB

[56] References Cited

U.S. PATENT DOCUMENTS 3,999,023   12/1976   Sedley .................... 200/46

Primary Examiner—Herman Hohauser
Attorney, Agent, or Firm—Gordon Wood

[57] ABSTRACT

A magnetic card reader for providing an output to a utilization device. A plurality of reed switches are arranged in coplanar relationship in a manner to optimize the number of data sensors in a given area. In addition, a magnetic card is disclosed for providing completely different and independent magnetic data on the opposite surfaces thereby allowing sensing or reading devices to be placed on both sides of the card.

8 Claims, 6 Drawing Figures

MAGNETIC CARD READER

This application is a continuation-in-part of application Ser. No. 556,655, filed Mar. 10, 1975, entitled Magnetic Card Reader, now U.S. Pat. No. 3,999,023 issued Dec. 21, 1976.

This invention relates to magnetic card readers for reading the combination or code of a magnetic card having magnetized spots at predetermined points thereon.

The main object of the present invention is the provision of a magnetic card reader and a magnetic card which are adapted to provide an optimum number of data sensors for a given area of the card and reader.

In copending application Ser. No. 556,655, filed Mar. 10, 1975, there is discloslsed a new method of magnetic card and coding of barium ferrite type cards. The process disclosed produces enhanced magnetic flux on the card by first encoding a polarized area and then reversing out smaller areas within that area of opposite polarity. It has been found that using the previously disclosed method reed switches could be placed parallel to the card surface and by proper placement of the opposing polarities on the card relative to the gap between the reed leaves sufficient flux could be obtained to close the reed switches without the need of additional internal biasing in the reader. The desirability of obviating internal biasing in the reader is pointed in said copending application.

With respect to the structure of the copending application it has been found that the spacing between reed switches can be reduced to less than 3/16 of an inch using a card of total thickness of 0.030 inch containing a barium ferrite sheet of about 0.020 inch thick. Even with this improved method and using small commercially available reed switches, only about 10 to 12 reed switches could be accomodated within a one square inch area. If the spacing between the reed switches is increased to a ¼ inch for added reliability, the density of the switches is reduced to ten or less.

By the present invention it is possible to arrange sixteen reed switches within an area of one square inch and retain an end spacing between switches of about ¼ which is desirable.

Another object of the invention is the provision of a magnetic card having a magnetic pattern which can be encoded with simple equipment and which is inexpensive to build and which, at the same time, can provide a density of sixteen reed switches within a square inch to read BCD coded numbers up to 9,999 (four full digits) or 65,535 binary numbers.

Another object of the invention is the provision of a magnetic card which may be provided with completely different and independent magnetic data on the opposite surfaces. The provision of such a card allows sensing or reading devices to be placed on both sides of the card instead of on only one side. Such a card can provide, for example, means for actuating a locking device by means of the magnetic spots on one side and at the same time permitting the readout of a serial number from the opposite side of the card. In this manner devices on which the card is used may be made smaller and more compact.

Another object of the invention is the provision of a magnetic card which is capable of withstanding flexing and abuse normally given to a metal key.

Still another object of the invention is the provision of a card which can be made much smaller than some presently available cards and at the same time retain equal data capability.

Other objects of the invention will be apparent from the following specification and from the drawings.

FIG. 1 is a top plan view of a magnetic card reader with a card inserted therein. The reader is partially broken away to show internal structure. Magnetically encodable areas on the card are shown schematically by shading.

Figure 1:
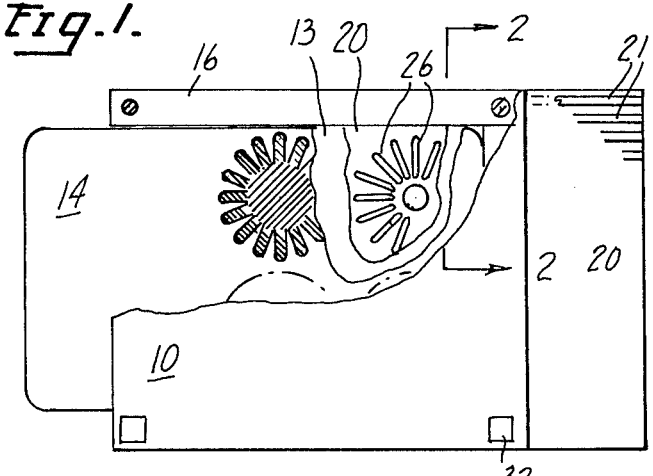
Figure 2:
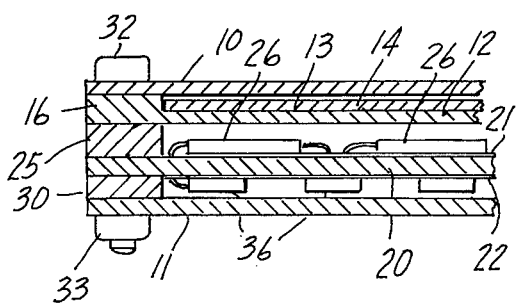
FIG. 2 is an enlarged fragmentary sectional view taken in a plane indicated by lines 2—2 of FIG. 1.

With reference to FIGS. 1 and 2 the invention comprises an upper plate generally designated 10 of magnetizable material such as steel and a lower plate 11 also of magnetizable material. Under the upper plate 10 is a plate 12 of nonmagnetic material such as aluminum (see FIG. 2). The thickness of plate 12 is reduced along its central portion so that a relatively wide slot 13 is provided into which a magnetic card 14 may be inserted from the left hand end of the reader as shown in FIG. 1. By this structure the enlarged marginal portion 16 of plate 12 provides space to allow adequate clearance for the card 14.

Spaced downwardly from the plate 12 is a printed circuit board 20 formed with upper and lower printed circuits 21, 22 (FIG. 2). This printed circuit board is spaced downwardly from plate 12 by means of longitudinally extending spacers 25 so as to provide sufficient space between plate 12 and printed circuit board 20 to accommodate an arrangement of reed switches 26. Referring to FIG. 1 each reed switch 26 is connected to a corresponding upper printed circuit indicated schematically at 21 in FIG. 1. The opposite end of each reed switch is connected to a corresponding lower printed circuit 22.

Spaced downwardly from printed circuit board 20 by means of longitudinal spacers 30 is the lower steel plate 11. Spacer 30 is preferably sufficiently thick to permit diodes 36 to be fastened to the under side of board 20. The above described assembly is connected together by means of screws 32 and nuts 33. The elements of the above described assembly are provided with suitable openings for the shanks of bolts 32 to be received therethrough.

Figure 3:
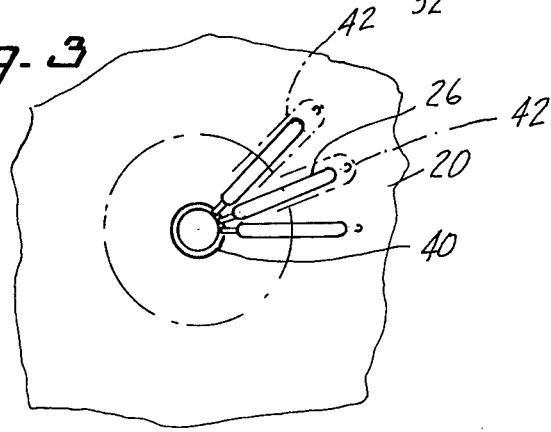
FIG. 3 is a fragmentary plan view of a printed circuit board showing the arrangement of the reed switches thereon. Only a few of the reed switches are indicated in full line.

As best seen in FIG. 3 the reed switches 26 are arranged radially with respect to a central hub 40 which may comprise an eyelet communicating with the opposite side of the board 20 and printed circuit 22. Since it is usual to common a plurality of the reed switches into an electrical circuit, the connection of all reeds at the hub 40 is especially advantageous. If separation of the reeds into sets of four for BCD characters is desired, the hub can be etched into quadrants or other patterns to accommodate various combinations of commons. It will be seen that the arrangement of FIG. 3 provides for sixteen reed switches so that this number of conventional reed switches may be arranged so that wihin a one inch square area the outer ends of the reed switches may be spaced apart about ¼ This reduces any interaction between reeds caused by encoded areas on the card which are designed to act on a single reed but not those adjacent thereto.

Figure 4:
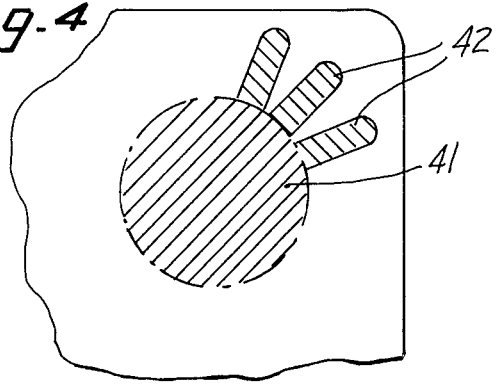
FIG. 4 is a fragmentary plan view of a portion of a magnetic card showing schematically one method of encoding the card. Only a few of the bar shaped areas are indicated.

One method of encoding a magnetic card for use in conjunction with the reed switch array of FIG. 3 is shown in FIG. 4. In this case a circular area 41 of the card is provided which has a diameter such that the area extends to the center of the gaps of the reeds in the reed switches.

Extending radially outwardly from the central magnetized hub 41 are radially extending bar shaped magnetizable areas 42 extending to a point adjacent the outer end of the reed switch. The areas 42 thus occupy areas registering with the outer ends of the reed switches and selected ones of said radially extending areas may be magnetized with a polarity opposite to the polarity of said central hub.

In some situations the arrangement of FIG. 4 may not be desirable. For example, some reed switches are so sensitive to magnetic flux that a strong field at one end could cause the reed to close even though no opposing field was present at the opposite end. To eliminate this possible effect the preferred form of the invention is shown in FIG. 5.

Figure 5:
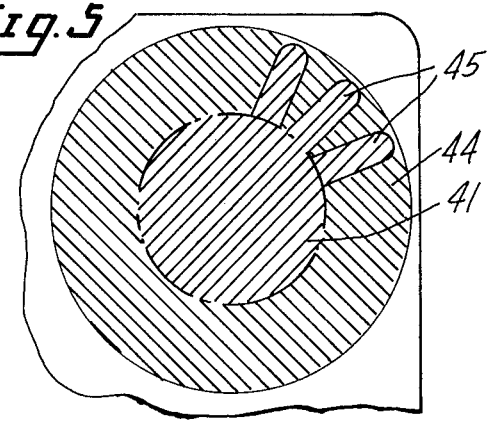
FIG. 5 is a view similar to FIG. 4 showing the preferred method of encoding a card.

In FIG. 5 the same central hub 41 is magnetized with one polarity and an outer area 44 having an extent sufficient to encompass the full circular area of the reed array is encoded with a polarity opposite to that of the hub. It will be noted that a card so encoded, when inserted with the hub centered over the center of the reader array and in close proximity to the corresponding reed switches, would close all switches since each switch "sees" strong opposing polarities at each end. To code this card with various combinations of open and closed reeds to form electrical circuits representing serial numbers or control circuits, it is merely necessary to encode certain radially extending bars 45 with the same polarity as that of the hub area 41. By this arrangement the reed switches corresponding to the bar shaped areas 45 will "see" the same polarity at their opposite ends and will not close. The remaining reeds "seeing" opposite polarities will close. An advantage of this reed array pattern, in addition to its reliability in operation, is that it is also a deterrent to code deciphering by inspection of the magnetic areas with a suitable tool such as a magnetic viewer. Although the bars which turn off reed switches would be visible as spokes from the hub, the actual location of the remaining reed switches would not be visible, nor would there be any clue as to their numerical value.

As the reed switch array is one one side of the printed circuit board adjacent the card to be read, the opposite surface of the board may be utilized for additional circuit components such as diodes 36 for isolation purposes. This is desirable in the event that a plurality of reed arrays are connected into the same multiconductor table and it is desired to common all data bits to the same wires to conserve wire conductors. By this arrangement a very small circuit board is possible.

Figure 6:
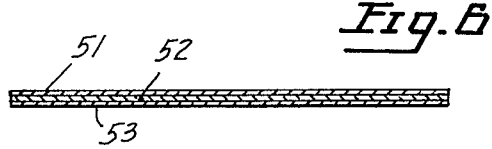
FIG. 6 is a longitudinal sectional view of the preferred form of magnetic card.

An improved magnetic card is shown in FIG. 6. This card is of three layers, the top layer 51 being provided with, for example, a locking code and the lower layer 53 being provided with a serial number. By the present invention a central core 52 preferably of magnetizable spring steel is bonded between the two upper and lower layers of barium ferrite magnetizable material.

Due to the core 52 a magnetic field is imposed on one face of the material with opposite north and south poles on opposite sides of the layer. In this way the field of such magetizable area will not penetrate the steel core sufficiently to generate any appreciable field on the opposite side. Thus the steel core acts as a keeper for the magnetic data on both encoded magnetic upper and lower sheets.

In addition, a steel core strengthens the card and allows flexibility while maintaining a desired degree of rigidity. The central steel keeper maintains the magnetic strength of the magnetized areas on both sides and is a magnetic barrier preventing magnetic fields from crossing to opposite sides. In this way an encoding spot of suitable strength can be made by applying a pole to only one side.

I claim:

1. A magnetic card reader for reading a magnetized data card adapted to be placed in a predetermined position in said reader, said card having magnetizable points arranged in a predetermined arrangement to permit coding said card by magnetizing certain spots at certain of said points, said reader comprising:
   a base having a flat side,
   a plurality of elongated reed switches supported on said side in coplanar relationship and parallel to said side,
   means for positioning said card parallel to the common plane of said reed switches with the magnetizable points of said card in registration with and closely adjacent corresponding ends of said switches whereby the flux of the magnetized spots actuates the switches corresponding to such magnetized spots,
   said reed switches being arranged in a circular row and radially disposed relative to a common center.

2. A magnetic card reader according to claim 1 wherein said card is provided with magnetizable points arranged in a circular row with each of said points being in registration with one of said switches.

3. A magnetic card reader according to claim 2 wherein said card is provided with a plurality of radially extending magnetized stripes adapted to receive magnetized spots of opposite polarity.

4. A magnetic card reader according to claim 3 wherein said elongated switches are arranged in registration with and parallel to said stripes.

5. A magnetically encoded card comprising:
   a relatively thin sheet including uniformly distributed magnetizable material,
   a relatively large circular area of the encodable area of said card being magnetized in a direction perpendicular to the faces of said sheet, and
   an encoding magnetized area radially outwardly of said circular area.

6. A magnetically encoded card according to claim 5 wherein said radially outward area is a radially extending bar shaped area.

7. A magnetically encoded card according to claim 5 wherein an annular area outwardly of said circular area is magnetized with a polarity opposite to the polarity of said circular area and said encoding magnetized area is of the same polarity as said circular area.

8. A magnetically encoded card according to claim 5 wherein said sheet comprises a pair of layers of magnetizable material and a single layer of magnetic material interposed between said pair.

* * * * *